(12) United States Patent
Dumoulin et al.

(10) Patent No.: US 11,789,127 B2
(45) Date of Patent: *Oct. 17, 2023

(54) MULTI-BEAM LASER SCANNER

(71) Applicant: HEXAGON TECHNOLOGY CENTER GMBH, Heerbrugg (CH)

(72) Inventors: Charles Leopold Elisabeth Dumoulin, Balgach (CH); Jürg Hinderling, Marbach (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/845,873

(22) Filed: Jun. 21, 2022

(65) Prior Publication Data

US 2022/0334229 A1 Oct. 20, 2022

Related U.S. Application Data

(63) Continuation of application No. 16/138,855, filed on Sep. 21, 2018, now Pat. No. 11,397,246.

(30) Foreign Application Priority Data

Sep. 25, 2017 (EP) ..................... 17193010

(51) Int. Cl.
*G01S 7/481* (2006.01)
*G01S 17/89* (2020.01)
(Continued)

(52) U.S. Cl.
CPC .......... *G01S 7/4817* (2013.01); *G01C 15/002* (2013.01); *G01S 7/4808* (2013.01);
(Continued)

(58) Field of Classification Search
CPC .... G01S 7/4817; G01S 7/4808; G01S 7/4815; G01S 7/4865; G01S 17/26; G01S 17/42;
(Continued)

(56) References Cited

U.S. PATENT DOCUMENTS 6,327,029 B1 12/2001 Matsuoka
8,072,581 B1 12/2011 Breiholz
(Continued)

FOREIGN PATENT DOCUMENTS

CN 101212854 A 7/2008
CN 102597803 A 7/2012
(Continued)

OTHER PUBLICATIONS

European Search Report dated Mar. 14, 2018 as received in U.S. Appl. No. 17/193,010.
(Continued)

*Primary Examiner* — Yuqing Xiao
*Assistant Examiner* — Jempson Noel
(74) *Attorney, Agent, or Firm* — Maschoff Brennan

(57) ABSTRACT

A laser scanner has multiple measuring beams for optical surveying of an environment. The laser scanner is configured to provide scanning with at least two different multi-beam scan patterns. Each multi-beam scan pattern is individually activatable by a computing unit of the laser scanner.

16 Claims, 7 Drawing Sheets

(51) Int. Cl.

| | |
|---|---|
| *G01S 17/42* | (2006.01) |
| *G01S 17/26* | (2020.01) |
| *G01S 17/931* | (2020.01) |
| *G01C 15/00* | (2006.01) |
| *G01S 7/48* | (2006.01) |
| *G01S 7/4865* | (2020.01) |
| *G02B 26/10* | (2006.01) |

(52) U.S. Cl.
CPC .......... *G01S 7/4815* (2013.01); *G01S 7/4865* (2013.01); *G01S 17/26* (2020.01); *G01S 17/42* (2013.01); *G01S 17/89* (2013.01); *G01S 17/931* (2020.01); *G02B 26/105* (2013.01)

(58) Field of Classification Search
CPC ..... G01S 17/89; G01S 17/931; G01C 15/002; G02B 26/105
See application file for complete search history.

(56) References Cited

U.S. PATENT DOCUMENTS

| | | | |
|---|---|---|---|
| 8,514,165 | B2 | 8/2013 | Yoshida |
| 8,836,922 | B1* | 9/2014 | Pennecot ............... G01S 7/4815 356/9 |
| 9,407,364 | B2 | 8/2016 | Dumoulin et al. |
| 9,417,316 | B2 | 8/2016 | Schumann et al. |
| 9,456,201 | B2 | 9/2016 | Masalkar et al. |
| 9,726,482 | B2 | 8/2017 | Iseli et al. |
| 9,791,272 | B2 | 10/2017 | Hinderling et al. |
| 9,841,495 | B2 | 12/2017 | Campbell et al. |
| 9,869,754 | B1 | 1/2018 | Campbell et al. |
| 10,330,466 | B2 | 6/2019 | Kipfer et al. |
| 10,502,816 | B2 | 12/2019 | Rae et al. |
| 11,092,672 | B2 | 8/2021 | Jeong et al. |
| 2009/0128798 | A1 | 5/2009 | Danziger |
| 2015/0034613 | A1 | 2/2015 | Hosseini |
| 2017/0003392 | A1 | 1/2017 | Bartlett et al. |
| 2017/0016981 | A1 | 1/2017 | Hinderling et al. |
| 2017/0082735 | A1 | 3/2017 | Slobodyanyuk et al. |
| 2018/0259625 | A1 | 9/2018 | Gnecchi et al. |
| 2018/0284237 | A1* | 10/2018 | Campbell ............. G01S 17/931 |
| 2018/0341009 | A1* | 11/2018 | Niclass ................. G01S 7/4817 |

FOREIGN PATENT DOCUMENTS

| | | |
|---|---|---|
| CN | 104101335 A | 10/2014 |
| CN | 104428626 A | 3/2015 |
| CN | 105716559 A | 6/2016 |
| CN | 105992960 A | 10/2016 |
| CN | 106896369 A | 6/2017 |
| DE | 44 39 298 A1 | 6/1996 |
| EP | 1 832 897 B1 | 9/2007 |
| EP | 3 118 651 A1 | 1/2017 |
| JP | 2000-338245 A | 12/2000 |

OTHER PUBLICATIONS

Jose-Antonio Yague, et al., "Characterisation of 1D opto-electronic sensors and their application to angular self-centring probes for machine-tool verification," Measurement, vol. 41, Issue 10, pp. 1113-1123 (Dec. 2008).

Guan-Jun Guo, et al., "Effect of Pulse Spreading on the Ranging Performance of Airborne Laser Scanner," Opto-Electronic Engineering, vol. 37, Issue 3, pp. 51-60 (Mar. 2010).

* cited by examiner

MULTI-BEAM LASER SCANNER

FIELD

The disclosure relates to a laser scanner having multiple measuring beams.

BACKGROUND

To detect objects or surfaces in an environment, often methods are used which perform scanning by means of a laser scanner. In this case, the spatial position of a surface point is detected in each case by measuring the distance to the targeted surface point by the laser distance measuring beam and by linking this measurement to angle information of the laser emission. From this distance and angle information, the spatial position of the detected point can be determined and, for example, a surface can be continuously measured. Often, e.g. in parallel to this purely geometric detection of the surface, an image recording by a camera is carried out which also contains further information in addition to the overall visual view, e.g. with respect to the surface texture.

3D scanning is an effective technology to produce within minutes or seconds millions of individual measurement data points, in particular 3D coordinates. Some measurement tasks include the recording of objects or their surfaces such as industrial plants, facades of houses or historic buildings, or accident locations and crime scenes. Scanning devices with scanning functionality are, for example, total stations or theodolites which are used to measure or create 3D coordinates of surfaces. For this purpose, they may be able to guide the measuring beam—usually a laser beam—of a distance measuring device over a surface or along an edge, and thus—at a given sampling or measuring rate—to successively capture scanning data, e.g., distance and direction, associated to different measuring points.

Scanning data are referenced to each other with respect to a measuring reference point, e.g. the location or zero point of the measuring device, in order that they lie in a common reference or coordinate system. A so-called 3D point cloud can then be generated from the plurality of scanned points, e.g., from the distance measurement value and the measuring direction correlated therewith for each point, e.g. by means of an integrated or external data processing system.

Measuring devices with scanning functionality may also be implemented as LiDAR systems, e.g. for airborne landscape surveying. Thereby, laser pulses are transmitted from a moving carrier, e.g. an aircraft or a drone (UAV, "unmanned aerial vehicle"), towards the surface according to a defined scanning pattern, e.g. via a rapidly adjustable deflecting element such as a sweeping mirror or a refractive optical component. Based on returning parts of the radiation emitted to the ground an accurate surface model of the ground to be measured can be derived, e.g. wherein the proper motion of the carrier is taken into account by means of a global satellite positioning system (GNSS) and/or by means of an inertial measuring system (IMU).

A further measuring task for scanning measuring devices is the monitoring of an environment, e.g. within the framework of a warning or control system for an industrial production facility, or in a driving assistance system such as a collision avoidance system.

Applications of scanning instruments may also lie in underground construction or mining, e.g. in the determination of the shape and area of tunnel cross sections or in the determination of the volume of excavation pits or gravel heaps.

In the area of autonomous driving vehicles, the roads to be driven may be recorded in advance and stored in a model. For this purpose, vehicles equipped with scanners are used to scan and map the region in question. For example, a LiDAR module may be used, which has to fulfil specialized requirements for this task, in particular with respect to the field of view (FoV) and the detection rate. For example, the horizontal field of view should be about 80 degrees, wherein the vertical field of view may be substantially smaller, e.g. about 25 degrees. The acquisition rate for the scanning of the complete field of view is, for example, approximately 25 Hz.

In principle, such laser scanning devices are designed, for example, with an electro-optical laser-based distance meter to detect a distance to an object point as a measuring point, wherein a deflection element may be present to vary the measuring direction of the laser distance measuring beam, e.g. with respect to one or several independent spatial directions, whereby a spatial measuring or scanning area can be captured.

By way of example, a deflecting unit may be realized in the form of a moving mirror or alternatively also by other elements suitable for the controlled angular deflection of optical radiation, such as rotatable prisms, moving optical fibers, refractive optical elements, deformable optical components, etc. The measurement usually takes place with the determination of distance and angles, which is to say in spherical coordinates, which can also be transformed into Cartesian coordinates for display and further processing.

In particular, a laser scanner can have separate beam paths, e.g., one for the transmitted radiation and one for the receiving beam, or the beam paths of the transmitting channel and of the receiving channel can at least partially overlap. In particular, the beam paths can thus be configured in such a way that a deflection unit acts only on the transmitted radiation, e.g., wherein the imaging effect of the reception channel is substantially independent of the control of a beam deflecting element of the deflecting unit. By way of another example, the transmission channel and the reception channel may each have their own deflection unit which can be controlled separately, or a single deflecting unit may act both on the transmitted radiation and on the receiving radiation.

Various principles and methods may be available in the field of electronic or electro-optical distance measurement. One approach is to emit pulsed electro-magnetic radiation, e.g. laser light, to a target to be measured and to subsequently receive an echo from this target as a back-scattering object, wherein the distance to the target to be measured can be determined by the time-of-flight (ToF), the shape, and/or the phase of the pulse. Such laser distance meters have now become standard solutions in many areas.

For the detection of the returning pulse or a returning pulse sequence, two different approaches or a combination thereof are usually used.

In the so-called threshold method, a light pulse is detected when the intensity of the radiation incident on a detector of the distance measuring device exceeds a certain threshold value. This threshold reduces noise and interference signals from the background being confused as measuring signal. However, in the case of weak return pulses, e.g. caused by larger measuring distances, detection of measuring signals is no longer possible as soon as the pulse intensity is below the set detection threshold. Thus, the essential disadvantage of this threshold method is that the amplitude of the measurement signal may be sufficiently larger than the amplitude of optical and electrical noise sources in the signal path. Therefore, to sufficiently reduce misdetections, a threshold may be set to a certain level wherefore measurements over relatively long distances the threshold value method may only be applicable at certain conditions.

The other approach is based on sampling the returning pulse. This approach may be used for weak backscattered signals (e.g. pulse signals), e.g. caused by larger measurement distances. This method may also be regarded as holistic signal acquisition, wherein the complete measuring signal as well as the essential noise information is determined, which leads to an increase in measuring accuracy. An emitted signal is detected by sampling detector data associated to radiation detected by a detector, identifying a signal within the sampled data, and finally by determining a return time of the signal. By using a multiplicity of sampling values and/or by synchronized summation of the detector data with respect to the emission rate, a useful signal can also be identified under unfavorable circumstances, so that measuring over even greater distances or noisy or interference-prone background scenarios becomes possible.

A multi-beam laser scanner may be embodied to generate multiple individual measuring beams, each beam having a small divergence angle, instead of a single measuring beam. Individual beams may be sent out as an initially immediately diverging or as an immediately converging set of beams, e.g. arranged in a common plane (diverging line laser/strip laser/fan laser) or arranged such that they generate a cone of individual beams. Alternatively, individual beams may be sent out parallel to each other.

Thus, the beams of the plurality of measuring beams are generated in such a way that they define a plurality of substantially instantaneous scanning axes. In other words, individual pulses of different beams are generated "substantially at the same time", e.g., in a time synchronized fashion but not necessarily exactly at the same time. In some cases, the individual pulses are sent out slightly offset to pulses of neighboring beams, e.g. to reduce cross-talk effects.

Multi-beam laser scanners have several advantages, e.g. achieving a higher point rate or a higher point density, e.g. with a slower rotation speed of a rotating beam deflection mirror. However, individually emitted beams have to be aligned in each case to associated reception areas, wherein crosstalk between individual beams, e.g. wherein a specific reception area associated to a first beam detects light of a second beam sent out close to the first beam, may limit the capability of multi-beam measurements.

Crosstalk limits the effective range of the multi-beam receiver. To reduce crosstalk, several options may be available, e.g. reduction of beam density, beam masking using for instance LCDs, or complicated optical arrangements to precisely align multiple emitter-detector pairings.

Furthermore, the point density of the measuring beams projected onto a target object may depend on the distance between the laser scanner and the object, wherein the point distribution may depend on an orientation of the laser scanner, particularly a relative orientation of a deflecting element with respect to a multi-beam pattern generated upstream of the deflecting element.

For example, in the case of a line scanner an orientation of the projected line on the object may change with the azimuth angle of a rotating deflection mirror, or, by way of another example, having a set of beams diverging from a single point of origin, e.g. a cone of beams, and using only a single scan direction, e.g. defined by a rotating mirror, the spatial resolution of the system is limited because of the high density of points generated in the scan direction but the low density of points perpendicular to the scan direction.

It is therefore an object of the present disclosure to provide an improved and versatile laser scanner, which overcomes the above mentioned limitations.

This object is achieved by realizing the features of the independent claim. Features which further develop the disclosure in an alternative or advantageous manner are described in the dependent patent claims.

The disclosure relates to a laser scanner for optical surveying of an environment, comprising a multibeam transmitter configured for generating multiple measuring beams, particularly pulsed laser beams, defining multiple substantially instantaneous scanning axes, a receiver configured to detect returning parts of the multiple measuring beams, and a computing unit configured for controlling the laser scanner to provide scanning of the environment by the multiple measuring beams, for deriving distance measuring data based on the multiple measuring beams, and for deriving angle data for respective emitting directions of individual measuring beams of the multiple measuring beams.

According to the disclosure, the laser scanner is configured to provide scanning with at least two different multi-beam scan patterns, based on the multiple measuring beams, wherein each multi-beam scan pattern is individually activatable by the computing unit.

In particular, the multi-beam scan patterns differ from each other in that, compared to each other, they provide at least one of a different number of beams, a different projected beam density, e.g., the beam density projected onto a target object in the environment to be scanned, a different projected beam distribution, e.g., the beam distribution projected onto a target object in the environment to be scanned, a different beam spacing, a different emission timing, particularly a different pulse emission timing, different individual beam shapes, particularly different divergence angles of individual beams, and a different spreading direction of their beams, particularly wherein one multi-beam scan pattern is provided as a set of beams which converge to each other such that the beams have a common point of intersection in propagation direction of the beams, and another multi-beam scan pattern is provided as a set of beams which diverge from each other.

Thus, the inventive laser scanner can be adapted on the fly to be used in a diversity of different applications and environments, wherein optimized workflows are enabled. For example, in the case that no a-priori knowledge of the environment or the positioning of the laser scanner is available, e.g., spatial position and/or orientation of the laser scanner, a measuring process is enabled comprising a rough initial scan with a subsequent measuring scan, optimized based on the initial scan. With a-priori knowledge of the environment and the scanner positioning, the initial rough scan can be omitted.

By way of another example of a multi-beam scanner with a spread of the measurement beams inline with the scan direction, the returns of leading beams in scan direction may determine the density of the trailing beams in scan direction. Thus, in a further embodiment also the scan speed may be adjusted to allow for an even denser scan of the trailing beams.

By way of another example, e.g. in the field of autonomous driving, two different multi-beam scan patterns are sent simultaneously, whereby one scan pattern uses diverging beams of a first wavelength for monitoring/collision avoidance and a second scan pattern of a second wavelength is used for measuring/mapping the road.

According to one embodiment, the laser scanner comprises a deflection element configured for deflecting the multiple measuring beams in a temporally varying manner towards the environment.

According to another embodiment of the disclosure, the computing unit is configured to activate at least one of the at least two multi-beam scan patterns based on at least one of a distance to an object in the environment to be scanned, a defined projected point density to be achieved by the scanning, e.g. projected onto an object to be scanned, and a defined object type of an object in the environment to be scanned.

In a further embodiment the computing unit is configured to activate at least one of the at least two multi-beam scan patterns based on a pre-programmed measuring process defining an activation and deactivation sequence of multi-beam scan patterns of the at least two multi-beam scan patterns, in particular wherein the measuring process comprises at least one of an initial evaluation of distance measuring data associated to at least a first multi-beam scan pattern from the at least two multi-beam scan patterns and defining the activation and deactivation sequence based on the initial evaluation, an initial scanning for identifying an object within the environment to be scanned and defining the activation and deactivation sequence based on the identified object, determining an initial positioning of the laser scanner, particularly with respect to a pre-defined spatial reference point determined by a CAD system (CAD: "computer-aided design"), and adjusting a drive signal of the deflection element and/or a drive signal for adjusting an emission frequency of the measuring beams, e.g. for adjusting a scan speed.

The laser scanner may further comprise a first zoom optics and/or a first deformable lens element configured for setting different multi-beam scan patterns of the at least two multi-beam scan patterns, and/or the laser scanner may comprise a second zoom optics and/or a second deformable lens element configured for aligning a beam of the multiple measuring beams with the receiver.

The zoom optics associated to alignment of the returning beams onto the receiver may be reduced when large receiving arrays such as SPAD arrays are used. The zoom optics may particularly be configured to provide emitter-receiver alignment, for the purpose of setting different beam distributions between multi-beam scan patterns, and/or for setting different individual beam divergence angles of individual beams within the multi-beam scan patterns.

Another embodiment is characterized in that the transmitter comprises multiple laser diodes arranged on a carrier, particularly a curved carrier, the carrier has at least two different flexure states, and based on different flexure states in each case the laser diodes generate different multi-beam scan patterns of the at least two multi-beam scan patterns. In particular, for each laser diode a congruent optical receiver or a congruent optical receiver area is provided.

For example, multiple laser diodes may be arranged on a piecewise inclined surface, e.g. of an overall spherical shape, for creation of a divergent cone towards an inclined rotating deflection mirror deflecting the multiple measuring beams in a temporally varying manner towards the environment. The arrangement can include a transmitter aligned to the mechanical axis of rotation of the mirror (co-axial). Through the arrangement of the collimated laser diodes on the curved/piece wise inclined surface, each diode has its own pitch and yaw angle relative to the center axis of rotation of the mirror and each collimated laser diode is paired with an individual photodetector. Depending on the inter beam angle, the beams may be converging at close range, meet at some distance over a trajectory and then diverge. If the diodes are arranged on a convex spherical surface the beams meet at the center point of the sphere spanning the surface, whereas when arranged on a concave surface, the beams diverge. By adjusting the inter beam angle by means of adjusting the surface flexure, the coverage of the scanner can be optimized to the measurement range, azimuth speed, and/or desired point density. The returning light is deflected by the rotating mirror and gathered through a central focusing optics onto the plurality of photodetectors, wherein each photodetector has a small field of view to reduce the influence of background solar radiation and cross talk from neighbouring beams. In addition, each detector channel may have its own narrow band optical wavelength filter.

In a further embodiment, also the detector elements, e.g. individual photodetectors, are arranged on a curved surface, which eases the optical requirements with regard to focusing and spot size/shape. In particular, by the arrangement of the detector elements on a curved surface, the use of simple spherical optics may be sufficient compared to a-spherical optics (although flexible sensors are available). The optical receiving system can consist of refractive and diffractive elements, wherein these elements can also be combined into a single physical part.

According to another embodiment, the transmitter is configured such that the multiple measuring beams comprise at least one of measuring beams of at least two different wavelengths, measuring beams of at least two different polarization states, and measuring beams having at least two different pulse codings, in particular orthogonal pulse codings, particularly based on barker pulses.

Thus, to reduce optical cross talk, each laser diode may use a separate wavelength, or, to limit the amount of different components, two or more wavelengths may be used in such a manner as the wavelength alternates such that at least adjacent laser beams have a different wavelength.

Furthermore, as the reflection characteristics of many surfaces vary with wavelength, the use of multiple wavelengths has added benefit in that it gives the opportunity to spectrally classify the reflection properties of surfaces.

For example, using "white" light transmitters, it is possible to have more complete information of the same surface region, e.g. by using absorption stacks to distinguish between different wavelengths at the same exposed surface area of the detector. However, as the sensitivity of such photo-sensitive stacks is low, e.g. as compared to the sensitivity from avalanche photodiodes, such a system has a reduced range. The range of the system may be extended in that the distance results of the detector stack are averaged.

The use of multiple polarization states/multiple polarizers is a further method to differentiate between multiple beams emitted at the same time. However, the generally uncontrolled incident angles of a scanner scanning an unknown environment often introduces ambiguity because changes of the polarization state of the incident beam can happen depending on the angle of incidence and the material of the scanned object.

An additional measure to reduce crosstalk influence is by sending coded pulses. For example, often the entire waveform of the analog signal of the radiation detected by a detector is sampled by means of the so-called wave form digitizing method (WFD). In WFD a signal is transmitted, e.g. in the form of a single pulse or by a pulse coding such as a defined sequence of pulses or a defined modulation of pulses, wherein the returning signal is detected by means of sampling the signal provided by the receiver. After identification of the single pulse or the coding of the associated transmission signal (ASK, FSK, PSK, also known as distance or interval modulation, etc.) of a received signal the signal propagation time ("pulse propagation time", ToF) is determined, e.g. by means of the Fourier transformation or based on a defined path point of the sampled, digitized and reconstructed signal path, such as the turning points, curve maxima, or integrally by means of an optimum filter known from the time interpolation.

Examples of time-resolving signatures are center of gravity, sine-cosine transformation, or amplitude-defined FIR filters ("finite impulse response filter") with a weight coefficient derived from the pulse shape. To reduce any distance drift a corresponding time-resolved signature may also be compared with an internal start signal. To reduce irreversible sampling errors, additional digital signal transformations known to one skilled in the art may be used.

One of the simplest modulation modes is the marking of the individual pulses or the pulse sequences by distance coding, e.g. as described by EP 1 832 897 B1, which may be used for the purpose of re-identifiability. This recognition is desired when an ambiguity arises which may be caused by different scenarios occurring during a time-of-flight of pulses, e.g. if there is more than one pulse or a pulse group between the measuring device and the target object. Another available method for ambiguity resolution related to multiple pulses in air may include the time interval coding of short burst sequences, e.g. the distance between emitted pulse pairs as described by EP 3 118 651 A1.

Depending on the number of transmitters, the allowable eye-safety limits, and the desired range, each individual transmitter can have a separate unique code. To reduce the number of unique codes, the coded pulses are sent in such a way that adjacent transmitters send orthogonal pulses. For example, when using barker pulses, the extended pulse length does not affect the sharpness of the correlation peak when compared with sending of a single pulse. Barker pulses may also be beneficial in cases where the eye safety would allow for more laser power, whereas the peak power of the laser diode is at its limit. In such a case sending multiple pulses, for instance barker pulses, can result in a better channel separation and an increased signal-to-noise ratio (S/N).

Alternatively or in addition, by using holographic structures the number of transmitters may be reduced, e.g. by using holographic structures, a diffractive optical beamsplitter, and a single transmitter in the beam forming process. Therefore, instead of using a diode for each beam and wavelength, a hologram may be used.

In a further embodiment, the transmitter comprises one or multiple radiation sources, particularly the multiple radiation sources generating radiations of different wavelengths. The transmitter further comprises a holographic structure and is configured for generating a first and a second group of beams based on the holographic structure, particularly wherein the first group of beams is generated based on a first radiation source and the second group of beams is generated based on a second radiation source. According to this embodiment, the transmitter and the computing unit are configured that one multi-beam scan pattern of the at least two multi-beam scan patterns is based on the first group of beams and another multi-beam scan pattern of the at least two multi-beam scan patterns is based on the second group of beams.

In particular, according to another embodiment, the receiver comprises an objective lens, wherein the transmitter comprises the first and the second radiation source, particularly the first radiation source generating radiation of a different wavelength than the second radiation source. The transmitter is configured to generate the first group of beams based on the first radiation source and to generate the second group of beams based on the second radiation source, wherein the holographic structure is configured that the beams of the first and the second group of beams emanate from a circumferential area surrounding the objective lens.

The same hologram may be used for different wavelengths, wherein the distribution of the resulting beams will then be different. For example, using a beam combiner to combine the laser sources prior to illumination of the hologram (like a fibre for instance) it would be possible to use the same hologram at the same location. In particular, multiple holograms can be integrated into a single physical element.

By way of another example, using radiation sources of different wavelength, a single hologram is illuminated for each wavelength by a separate laser. Because of the multiplication factor of beams projected by the hologram, groups of beams of the same wavelength are generated. The beam groups are mixed in the monitored zone so that there is no overlap of projected beams of the same group/wavelength in the monitored zone.

Furthermore, it is also possible to differentiate between the channels by other means, e.g. by code sequences, wherein the first group of beams is linked to a first diode emitting a first code, and a second group is linked to a second diode emitting a second code. In the monitored zone, physically, the beams of a group are not located together but mixed with the beams of the other groups. The group of beams may emanate from a similar local region/from a single hologram. The orientation of the beams is then chosen so as to achieve the correct mixing of the beam alignments in the monitored zone. Both methods, e.g. multiple wavelengths and code sequences for differentiation of adjacent beams, can be combined.

By way of example, multi-color back reflections, of which the beams are emitted by an apparently similar source or source direction, originating from the same or overlapping target area can be split at the receiver using for instance prisms or holographic dispersers. Using the hologram, cost and size of the transmitters may be reduced while maintaining the channel separation. In a distributed system concept in which the emitted beams surround the receiving optics, light guides/light fibers are used to deliver the beams emanating from a diode to the target hologram, e.g. arranged around a deflecting mirror. The light guides/light fibers can be used to combine multiple laser sources.

In a further embodiment, the holograms aligned to the transmitters are interchangeable, wherein through the variation of the holograms, the projection scan pattern is adjusted for optimization of the projection scan pattern in the monitored zone. For example, the optimization may be one of better point distribution with respect to the anticipated target shape (angle coverage) and distance, power distribution and therefore the range of the measurement. Actuators may be used for changing of the holograms, wherein the holograms may be arranged on a single surface through which a single actuator may be used for selection of a suitable hologram group, e.g., wherein a hologram group is a collection of holograms aligned to one or multiple radiation sources.

By way of another example, using a holographic grating, a (divergent) point source can be used to generate a collimated beam. By using multiple collimated beams with different inter beam orientation and spacing as the object source during hologram creation, multiple collimated object beams are reconstructed from a single point source, wherein the lateral position and inter orientation of the beams is determined during the creation of the hologram. When selectively using multiple holograms, each created with different lateral spacing and/or varying inter orientation of the beams and/or varying divergence of each beam, multiple emission patterns can be projected.

Re-creating (collimated) beams through the hologram makes it possible to collimate the beams without additional optical elements and holders therefore, wherein placing a light source at a different position (angle) compared to the position at the time of creation of the hologram creates a reconstructed beam at a different wavelength.

According to another embodiment, the receiver comprises an opto-electronical sensor based on an arrangement of a multitude of microcells, particularly wherein the sensor is configured as an array of single photon avalanche photodiodes, the sensor is configured such that the microcells can be read out individually or in groups of microcells, such that sub-areas of the receiver are settable which can be read out separately, and the receiver and the computing unit are configured that different sub-areas of the receiver are set by the computing unit, namely in such a way that returning parts of different measuring beams of the multiple measuring beams in each case are read out by different sub-areas of the receiver.

For example, arrays of single photon avalanche photodiodes, in the following called SPAD arrays, are usually arranged as a matrix structure on a chip. The devices or chips with a photosensitivity in the visible and near infrared spectral range are also referred to as SiPM (Silicon Photomultiplier). The SiPM gradually replace the photomultiplier tubes used hitherto, in particular in the visible and near ultraviolet spectral range. SiPM have a high spectral sensitivity in the visible wavelength range. For example, silicon-based SPAD arrays produced in CMOS technology are available, which are sensitive up to the near-infrared range beyond a wavelength of 900 nm.

Commercial SPAD arrays are also available at wavelengths between 800 nm and 1800 nm. These sensors mainly consist of the InGaAs semiconductor material. Depending on the design, these sensors also have an external or internal matrix structure over the photo-sensitive surface. Distance measuring systems with SPAD arrays in this spectral range have the advantage that the solar backlight (daylight) is significantly lower than the visible wavelength range and that this disturbing luminous flux is less detrimental to the SPAD arrays.

The special feature of these SPAD array sensors is their high photosensitivity, whereby the SPAD arrays are mainly designed to detect single photons without problems. Therefore, they are also referred to as "multipixel photon counters" (MPPC). The SPAD arrays consist of hundreds, thousands, and tens of thousands of microcells and are capable of simultaneously receiving pulses with thousands or hundreds of thousands of photons. In addition, due to the parallel connection of the many microcells into cell groups (domains), sufficient cells are still available for detecting the signal photons even in the case of solar background light.

A further special feature of SPAD arrays is that individual microcells or individual subsets of microcells can be separately controlled and/or separately read out. The microcells can thus be activated locally sequentially, e.g. for a line- or column-wise readout of the receiver (for example as a "rolling shutter" or "rolling frame").

In particular, subsets of microcells may be defined by a group of adjacent microcells, or the subregions may be defined by spaced-apart regions of the receiver, e.g., such that the individual subregions are defined by separate unconnected spatial groups of microcells.

Therefore, by using a SPAD array with individually addressable microcells, the active region of the SPAD array can be configured to match the selected alignment of an associated beam of the multiple measuring beams of the inventive laser scanner. Thus, the individual microcells of the SPAD array are grouped/selected so as to match the selected alignment/shape of the individual beams.

In addition, a time sequence of signal capturing may be generated in that individual microcells or microcell groups (domains) of the SPAD array are alternately led to the output, e.g. by alternating even and odd lines of the SPAD array. Such a time-alternating activation of microcells or microcell groups shortens the recovery time of the SPAD array, whereby a faster laser modulation or pulse shooting rate can be achieved.

Instead of activating the microcells or microcell groups (domains) of the SPAD array, they can remain activated in a stationary state, for capturing and evaluating the output of the microcells or domains synchronously to the scanning movement. In this case, the microcells or microcell groups (domains) are directly connected to the signal output, which are aligned in time-synchronous manner with respect to the surface of the object, by means of an electronic circuit, for example integrated on the SPAD array.

The respectively active FoV of the receiving unit is designed so small in the angular range that the backscattered receiving pulses can be completely viewed and received and, as little as possible, disturbing ambient light is received.

In the literature a distinction is made between SPAD array operations in linear mode, Geiger mode and SPL mode (SPL, "Single Photon Lidar").

In the linear mode below the breakdown voltage, a gain occurs which depends on a blocking voltage and temperature, wherein SPAD arrays in linear mode can be used for the construction of a high-sensitivity photoelectric receiver with an output voltage proportional to the radiation input.

In Geiger mode and SPL mode, e.g., in operation above the breakdown voltage a SPAD or SPAD arrays can be used for single photon counting. In a SPAD in Geiger mode, each individual pixel generates an output signal, whereby the electron avalanche is triggered by exactly one photon. If a photon packet consists of several photons, then no larger signal is measured. Therefore, no amplitude information is available.

In the Geiger mode, an incident photon packet produces a (binary) event signal, which is not proportional to the amount of photons in the photon packet.

SPL mode is a SPAD array operated in Geiger mode where many microcells are connected in parallel to an output signal. In the case of incoming photon packets with a few photons, the individual avalanches add up virtually linearly and the amplitude of the output signal is therefore proportional to the number of detected photons.

The recovery time of the microcells after a photonic trigger is not zero but, for example, between 5-50 nanoseconds, which reduces the apparent sensitivity of the SPAD array for subsequent photons. However, this has the advantage, for example, that the sensor can detect a signal strength range with high dynamics. For SPAD arrays with a large number of microcells (>1000) this non-linearity is monotonic and, on the one hand, leads to an amplitude compression between the input signal and the output signal, and, on the other hand, with increasing input signal, to a weakened increasing output signal. Interestingly, the output signal of SPAD arrays with a high number of microcells (>1000) does not completely saturate so that an amplitude change can be measured even with a reception pulse with a high photon number well over one million.

The laser signals of a distance measuring device are generally subjected to pulse coding. Experiments have shown that such signals can be well received with SPAD arrays at voltages in the overbreak mode. Also Pulse packets (bursts) can be received unambiguously and almost noise-free. For example this is also the case, when the recovery time of the microcells is quite long, e.g. ten nanoseconds. Due to the quasi-analogous construction of SPAD arrays, a photo current which is present due to ambient light is also received. The laser signal is then superimposed on the electrical photo current of the ambient light. For example, the current pulse generated by the laser pulse may be high-pass filtered at the output of the SPAD array, so that the slow falling edge signal is shortened. The output pulse thereby becomes a short signal pulse, e.g. with a pulse duration less than a nanosecond. Such short pulses with steep edges are suitable for precise time and distance measurements. However, the use of a high-pass filter (differentiator) does not affect the recovery time of the SPAD array.

Furthermore, initial implementation attempts have already been undertaken to integrate more electronic functionality into the SPAD arrays. By way of example, time-measuring circuits ("TOF-circuitries", TDC: "time to digital converter") assigned to each microcell are already used. These measure the runtime (TOF, "time-of-flight"). SPAD array implementations exist, for example, where precise photon counting is integrated in the vicinity of the microcells, which do not require a downstream analog-to-digital converter (ADC). In addition, a time-measuring circuit (TDC) may for example be integrated in each microcell. Further, a digital interface may be used as output of the SPAD array. For example, such devices are fully digital and do not need mixed signal processing during CMOS production.

According to another embodiment, the receiver comprises multiple opto-electronical sensors, particularly multiple arrays of single photon avalanche photodiodes, wherein the multiple sensors are arranged in a one-dimensional, a two-dimensional, or a three-dimensional manner, in particular wherein each sensor has its own control electronics, particularly also its own evaluation electronics.

For example, the individual sensors may be integrated into a single housing, forming an array of photo-active regions of which the orientation of the active region is linked to the transmitter through the optics. Such a receiver array may consist of a coherent two-dimensional array of detectors with regular equal and/or unequal spacing between the active elements constituting the array (so-called mega-array), wherein the alignment of the receiving array and the individual beams of the transmitter is made during the manufacturing process and can be dynamically changed depending on a chosen zoom, inter beam divergence, and the divergence of each individual beam.

In a further embodiment, the laser scanner comprises a customizable component, particularly an integrated circuit, wherein the customizable component comprises an optically active element formed by at least one of a customizable emitter array, particularly a VCSEL or a VECSEL array, configured to form a customizable emitting component for generating at least one beam of the multiple measuring beams, and a customizable receiving array, particularly an array of single photon avalanche photodiodes, configured to form a customizable receiving component for detecting returning parts of the multiple measuring beams, particularly whereby the receiving array is integrated onto the same integrated circuit as the emitter array.

For example, the laser scanner comprises a plurality of such customizable components, wherein each customizable component is configurable by software such that customizable components are grouped to at least one common receiving component and/or to at least one common emitting component.

Therefore, by way of example, the receiving array, e.g. a SPAD array, is combined with an emitter array on the same chip/wafer. The emitter array may be a VCSEL (vertical-cavity surface-emitting laser) or VECSEL (vertical-external-cavity surface-emitting laser) array. For instance, the collimation of the VCSEL array into a singular beam can be accomplished by a microlens array on wafer scale as a light gathering and pre-collimation lens array combined with a macroscopic lens.

Using the VCSEL/VECSEL structure as a receiving element of a time-of-flight sensor, the vertical cavity structure of the VCSEL/VECSEL may be used as a natural narrow-band optical filter element into which a photosensitive element has been integrated, e.g. an APD detector or SPAD detector. This way, each active component of chip/wafer can be selectively used for detection purpose, for example only, and not as an emitter, wherein the selection of which is controlled by software.

Thus, part of the integrated chip is selectively configured as light emitter whereas the other part is selectively configured as a light receiver. Individual emitting VCSELs can be grouped into a singular light emitting beam. Likewise, the non-emitting VCSELs with added light sensitive elements can be grouped into a singular receiver. Using both refractive and diffractive elements, it is also possible to arrange for multiple beams in different angular directions from the same chip. Using the same refractive and diffractive elements, the receiver can be configured to view in the same directions of the emitters. Also in an off-axis design it is possible to activate VCSELs at a spatially different location on the chip, which results in a different spatial orientation of the resulting laser beam. Likewise, the receiving part of the VCSEL array can be shifted by software to the correct lateral position on the same chip.

In a further embodiment, the integrated chip is configured that different wavelengths are integrated in different regions of the chip. This can for instance be accomplished with VECSELS by placement of the external cavity at a different distance.

Another embodiment relates to a combination of the integrated chip with a hologram.

In a further embodiment, the integrated chip—with or without hologram—is combined with a zoom lens with which the divergence of the emitted beams can be altered.

In an even further embodiment, the VCSEL cells are configured as a bottom emitter whereas the integrated receiver is a top emitter. This arrangement is no longer capable of configuring the whole active area as receiver and/or emitter, whereas the selective activation of the individual optically active elements of each array remains. For example, an advantage of this packaging arrangement is that the emitter element and the receiver element are pointing in opposite directions and stray light reflected off the optics for beam collimation no longer interfere with the receiving elements.

The alignment of many transmitting elements to many detectors during assembly is an elaborate task. This alignment may be accomplished through mechanical means, wherein the alignment process during manufacturing and subsequent testing of the stability during the development phase are significant cost drivers.

Following the mechanical alignment, the components are to be held in place mechanically. Usually this process is executed by a human operator or through an automated process. Using an electrically conductive glue, the fixation process can be actuated in a fast and reliable manner by sending a fixation command to an intelligence involved in the automation process which then sends an adequate current through the area involved. This process can be executed by the intelligence integrated onto the same board used for evaluation of the measurement signals and generation of the emitted pulses. This in-place fixation process after alignment results in simultaneous cost savings and quality improvement during the manufacturing of the device.

For example, by using a zoom optics the grid of the transmitters can be aligned to the grid of the detectors. The placement of the optical parts onto the circuit boards may be controlled with adequate placement tolerances, wherein the zoom optics is used to correct for the normal tolerances during production and assembly.

In particular, a classical zoom arrangement through manually moveable lenses may be sufficient and encompass only the receiving optical path. After alignment the mechanical position of the zoom lenses are fixed. Furthermore, the zoom of the receiving lens may be set using electronical means, for instance by setting the curvatures of a deformable lens element like a liquid lens. For example, this has the advantage in that the time taken and the skill used during assembly are much less compared to a manual process. In addition it is possible to correct for possible misalignment of the transmitters and receivers during the lifetime of the device or due to temperature variations.

By way of another example, a zoom optics is provided onto the transmitter and electronically actuated and controlled. By means of the zoom optics on the transmitter, the divergence of the beams is altered from a collimated state to a divergent state. In the diverging state, the beams encompass a large field of view and are, for example, suitable for collision detection and avoidance purposes. In the case when having a rotating mirror for beam deflection, due to the rotation of the mirror and the known 90° rotation of the projected beams, it can be sufficient to have cylindrical zoom optics by which the generated collimated beams are only divergent in a particular direction. Furthermore, the orientation of the transmitted beams to the rotational axis can be varied and a steering of the emitted beams is accomplished through the use of said zoom optics, wherein actuation of the emitting and receiving zoom optics may take place simultaneously/congruently. For instance, by using a liquid lens on the emitter optics, the variation of the orientation of the emitted beams and their divergence can be combined in a singular optical element.

In another embodiment, the laser scanner is configured to provide simultaneous scanning with a first and a second multi-beam scan pattern of the at least two multi-beam scan patterns, in particular wherein the repetition rate for deriving distance measuring data based on the first scan pattern is different from the repetition rate for deriving distance measuring data based on the second scan pattern.

For example, the first scan pattern may provide a set of diverging beams of a first wavelength, and the second scan pattern may provide a set of beams of a second wavelength, said second wavelength being different from the first wavelength.

BRIEF DESCRIPTION OF DRAWINGS

The laser scanner according to the disclosure is described or explained in more detail below, purely by way of example, with reference to working examples shown schematically in the drawing. Specifically.

DESCRIPTION OF EXAMPLE EMBODIMENTS

Figure 1A:
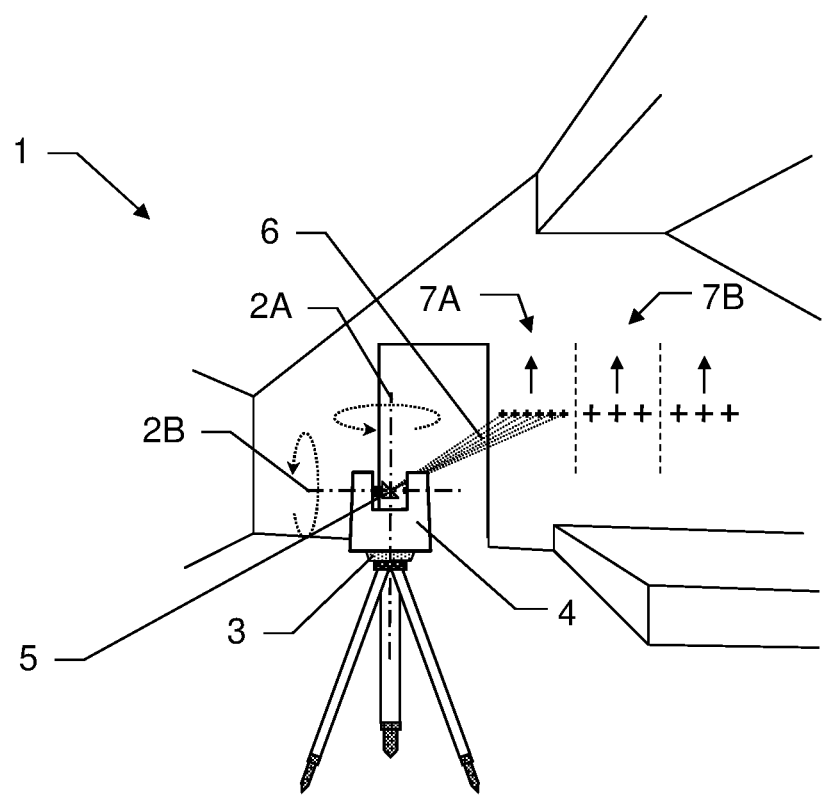
FIG. 1a-c: schematically depicts different applications of the inventive multi-beam laser scanner.

FIG. 1a shows an example laser scanner 1 in the field of building surveying, here with two rotary axes 2A,2B, e.g., a so-called slow (vertical) axis of rotation 2A—also referred to as the azimuthal rotation axis—and a so-called fast (horizontal) axis of rotation 2B. The laser scanner 1 comprises a base 3 and a support 4, wherein the support 4 is mounted on the base 3 in such a way that is rotatable around the slow axis 2A. The laser scanner further comprises a fast-rotating beam deflection element 5 mounted in the support 4 of the laser scanner 1 in such a way that it is rotatable around the fast axis 2B.

By way of example, e.g. for scanning linear or linearly drivable structures and environments such as track systems, roads, tunnel systems or flight fields, the base and thus the azimutal rotation axis 2A may be omitted. Instead, the laser scanner may be mounted on a transporting means, for example a ground- or air-supported carrier vehicle. Such a laser scanner with only one beam axis of rotation may be referred to as a profiler.

In particular, profilers but also two-axis laser scanners for a coherent measurement of a large area often have additional position and orientation means, e.g. directly integrated in the laser scanner, to automatically reference local scanning data with a global 3D coordinate system.

Furthermore, laser scanners may comprise a camera, e.g. for detecting RGB data, whereby the camera images of the environment can be linked to the scanning data generated by the distance measuring beam and associated angular encoder data for the direction of the distance measuring beam. For example, the camera can be individually movable, e.g. to detect different field of views and/or to orient the camera data and the scanning data with respect to a common reference surface or a common coordinate system.

According to the disclosure, the laser scanner 1 is configured to generate a plurality of beams 6 for scanning at the same time. Therefore, a higher point rate or a higher point density may be achieved with a slower rotation speed of the rotating deflection element 5. Furthermore, the laser scanner is configured to provide scanning with at least two different multi-beam scan patterns 7A,7B, based on the multiple measuring beams 6, wherein each multi-beam scan pattern 7A,7B is individually activatable.

For example, as shown by the figure, the multi-beam scan patterns 7A,7B may differ from each other in that, compared to each other, they provide a different number of beams and a different spreading direction of the individual beams, e.g. to set a different projected beam density and a different projected beam distribution on the target object. In the given example, the laser scanner may have been provided with rough pre-scan information, e.g. wherein the scanner comprises a pre-programmed scanning process involving a rough pre-scan with object identification and a subsequent measuring scan, and thus increase the point density for scanning objects like doors or windows, whereas for scanning blank walls the point density can be decreased to reduce data volume and computing power.

In another example the spreading of the beams is used to determine distance variances based on the leading beams for adjusting a scan density by the trailing beams. In yet another example the scan density of the (trailing) second beam set is set by the distance returns of the first (leading) beam set.

Figure 1B:
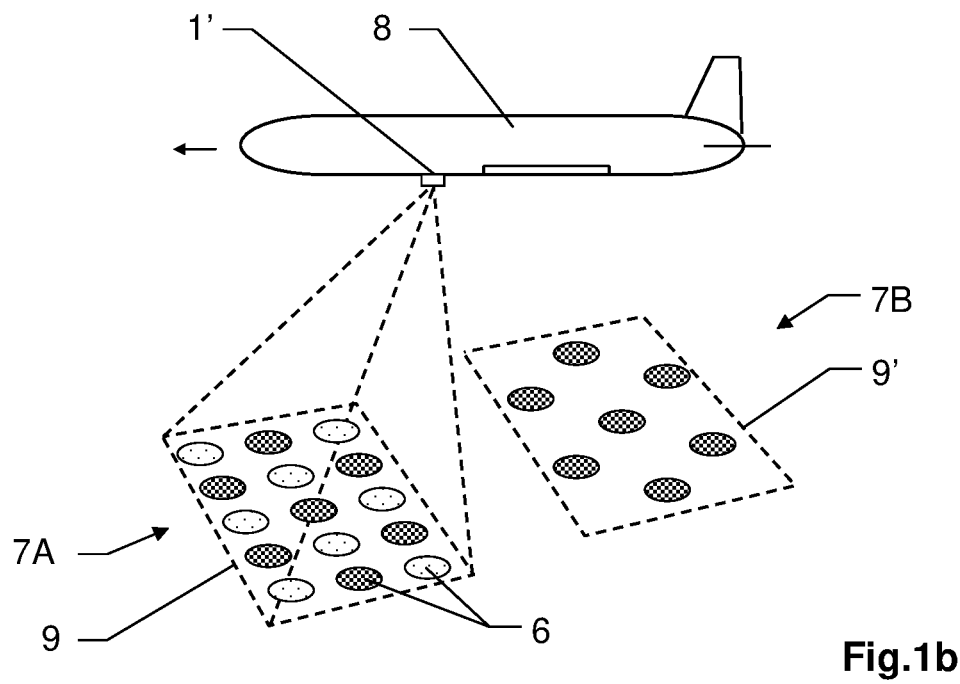

FIG. 1b shows another example airborne measurement based on an inventive LiDAR scanner 1' on board an airborne carrier 8, e.g. an airplane, for scanning with multiple LiDAR beams 6, e.g. here in a "staring" 2D configuration with a fixed viewing direction of the laser scanner 1'. This kind of configuration may be useful when using light-sensitive detectors such as in SPL applications. Multi-element (multi-pixel) detector devices are able to detect an incident flux of light (down to a single photon) providing information for each pixel on the number of photons and their arrival times. For example, the multiple LiDAR beams 6 are produced from a single transmitted laser pulse which then illuminates a ground surface area 9,9' with a size that is dependent on the flying altitude and the laser aperture. These kinds of aerial LiDAR systems have the advantage that, thanks to the high detector sensitivity, low energy laser beams can be used and scanning can be performed from high altitudes. Since each surface point is scanned from many different viewing angles shadow effects are greatly minimized.

Alternatively, a variable deflection element may be used to generate an additional scanning movement of the multiple LiDAR beams, e.g. a simple "zig-zag" scan by using a sweeping deflection mirror or more elaborated scan movements such as a circular scanning ("palmer scan"). For example, the latter may have the advantage that with one flyover, each measured surface point can be detected from two different viewing angles. This minimizes shadow effects, wherein a large area can be scanned at the same time with low energy laser pulses of even less energy than with the staring scanner configuration.

The surface is mapped, whereby different scanning patterns 7A,7B may be activated depending on flight altitude, and desired point density.

For example, the laser scanner 1' can thereby access further data for determining a relative or definite position of the laser scanner, e.g. data of inertial sensors provided by the carrier 8, altitude measurement data or data from a global positioning system. Furthermore, an available digital 3D model of the overflown terrain might be stored on a central control device of the airplane 8 or on a control and processing unit of the aerial laser scanner 1'. The laser scanner 1' may also have its own positioning measurement means or inertial measurement sensors for detecting self-movement of the laser scanner 1'.

The additional data may be partially processed by a computing unit of the carrier 8, or the laser scanner 1' may be configured to directly process the provided data, e.g. wherein a computing unit of the laser scanner continuously derives the position and orientation of the scanner and generates a movement profile of the laser scanner 1' and determines its position with respect to the surface to be measured.

Figure 1C:
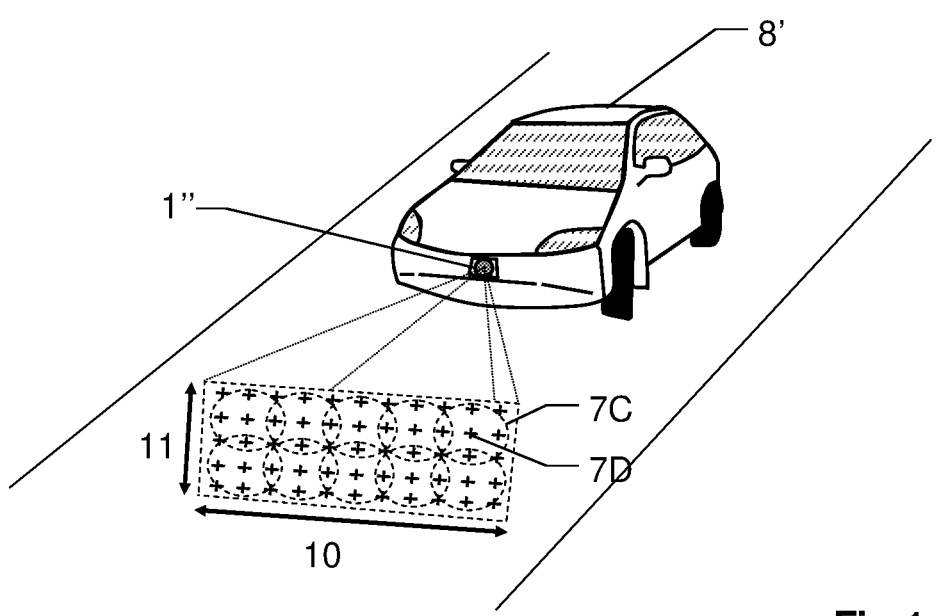

FIG. 1c shows a further application of the laser scanner 1" according to the disclosure in the area of autonomously traveling vehicles, wherein the roads to be driven may be recorded in advance by a dedicated LiDAR module 1" mounted on a vehicle 8' and the measurements are provided to a model generator. In such a laser scanner 1" the horizontal field of view 10 may be larger than the vertical field of view 11, wherein the acquisition rate for the scanning of the complete field of view may for example be approximately 25 Hz.

Such systems may include a robust and long-lasting design of the laser scanner, whereby also a compact design may be desired, and, where possible, moving parts are omitted. Thus, often MOEMS components ("micro-opto-electro-mechanical system") or adjustable or deformable refractive optical elements, e.g. liquid lenses, are used as deflecting elements here. In accordance with these specifications, by way of example, the inventive use of a SPAD-array sensor has the advantage that the opto-mechanic design of the receiving channel may be further simplified.

According to the disclosure, the laser scanner 1" may for example be configured to provide simultaneous scanning with a first 7C and a second 7D multi-beam scan pattern, e.g. wherein the repetition rate for deriving distance measuring data based on the first scan pattern 7C is different from the repetition rate for deriving distance measuring data based on the second scan pattern 7D.

For example, the first scan pattern 7C may provide a set of diverging beams of a first wavelength, which beams are particularly used for collision avoidance purposes, and the second scan pattern 7D may provide a set of converging beams of a second wavelength, said second wavelength being different from the first wavelength, wherein the beams of the second scan pattern 7D are particularly used for mapping the road.

Figure 2A:
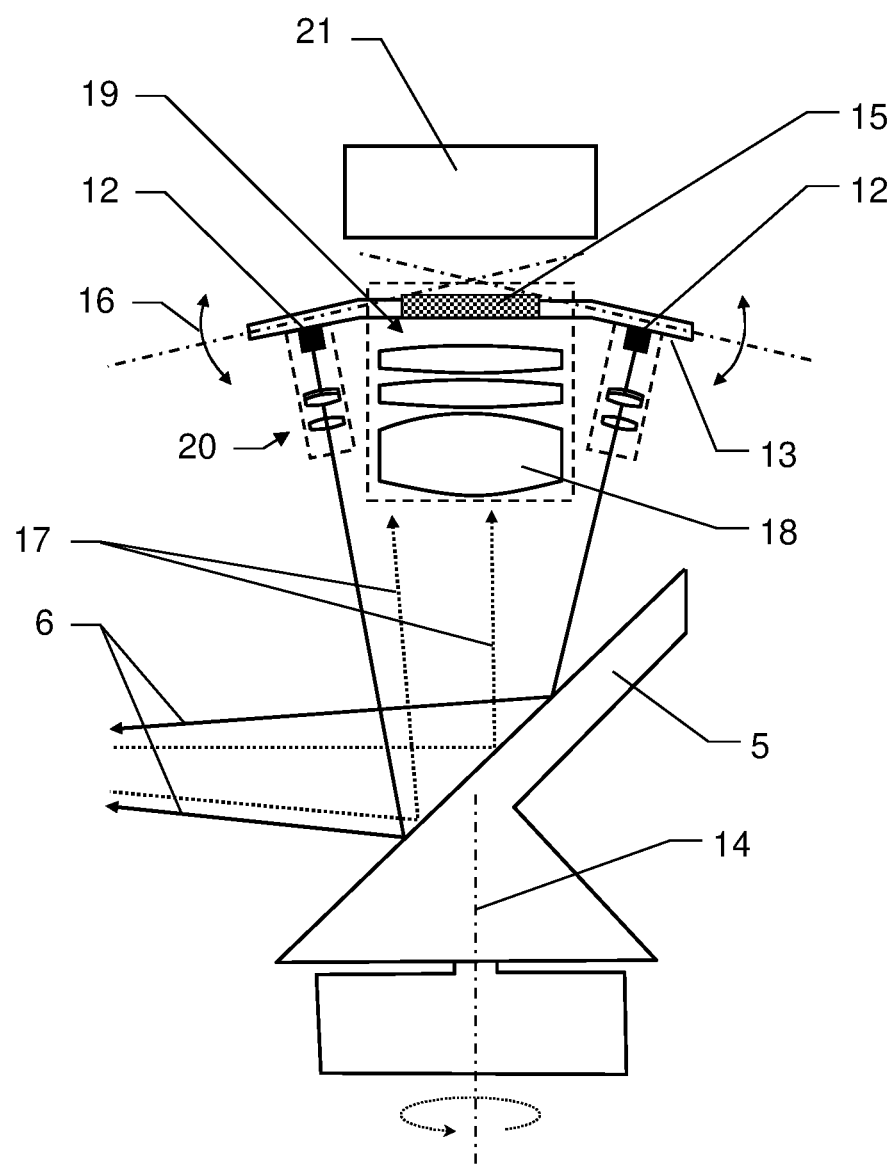
FIG. 2a,b: schematically depict an inventive multi-beam laser scanner comprising multiple laser diodes arranged on a carrier having at least two different flexure states.
Figure 2B:
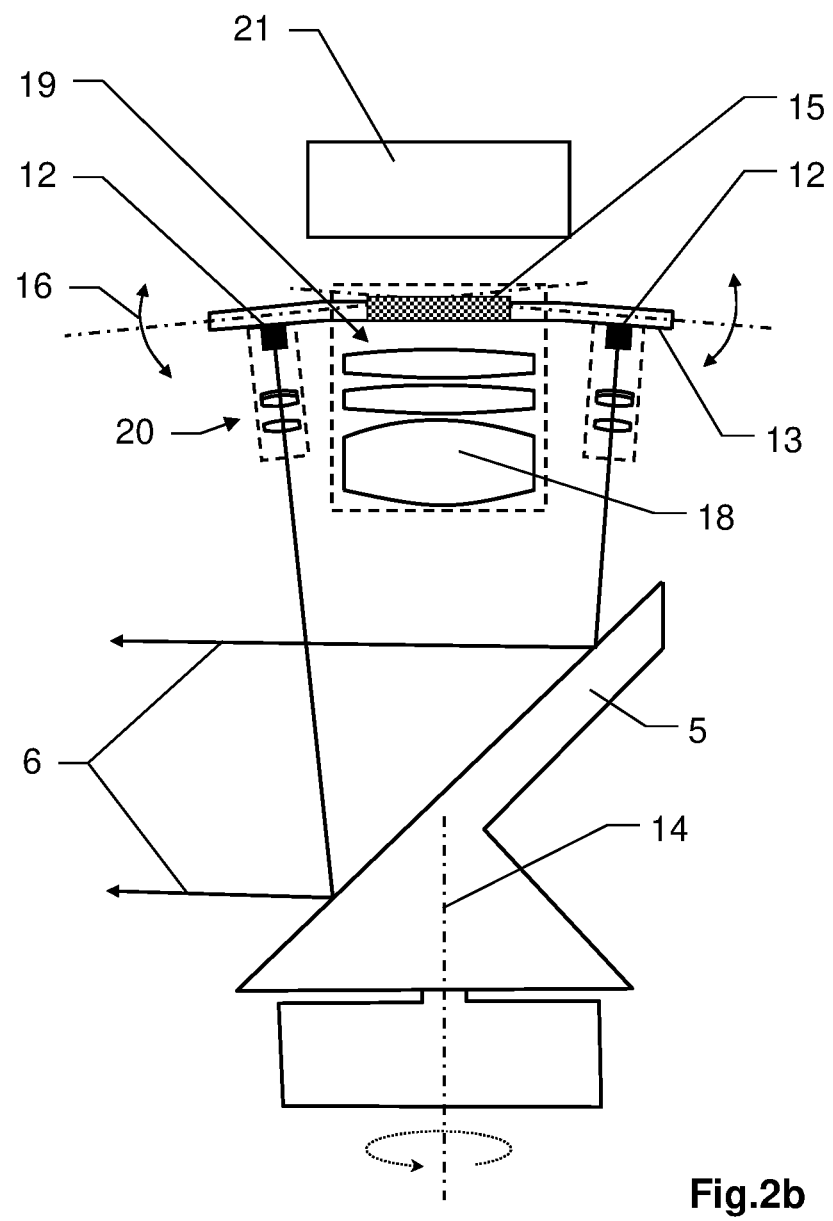

FIG. 2a,b schematically show a multi-beam laser scanner comprising multiple laser diodes arranged on a carrier having at least two different flexure states, FIGS. 2a and 2b depicting different flexure states of the carrier.

For example, multiple laser diodes 12 may be arranged on a piecewise inclined surface 13 for creation of a divergent cone towards an inclined rotating deflection mirror 5 deflecting the multiple measuring beams 6 in a temporally varying manner towards the environment. Each diode 12 has its own pitch and yaw angle relative to the center axis 14 of rotation of the mirror 5, wherein each laser diode 12 is paired with an associated detector or an associated receiving area of a detector 15 having multiple subareas for readout.

By adjusting the inter beam angle by changing the surface flexure, the coverage of the scanner is optimized to the measurement range, azimuth speed, and/or desired point density. The returning light 17 is deflected by the rotating mirror 5 and gathered by an objective 18 and a central focusing optics 19 onto the plurality of receiving areas of the detector 15, in particular wherein each receiving area has a small field of view to reduce the influence of background solar radiation and cross talk from neighbouring beams.

In addition, the diodes 12 may be configured to provide measuring beams of different wavelength and/or additional optics 20 may be used, e.g. filters with regard to wavelength and/or polarization to reduce optical cross talk effects or variable zoom optics for beam alignment purposes. Similarly, each detector channel may have its own narrow band optical wavelength filter (not shown).

Furthermore, a computing unit 21 is indicated, the computing unit 21 being configured for controlling the laser scanner to provide a scanning of the environment by the multiple measuring beams 6, for deriving distance measuring data based on the multiple measuring beams 6, and for deriving angle data for respective emitting directions of individual measuring beams of the multiple measuring beams 6.

By way of example, the computing unit 21 is configured to activate different multi-beam scan patterns based on a distance to an object in the environment to be scanned, a defined point density to be achieved by the scanning, and/or a defined object type of an object in the environment to be scanned.

For example, the computing unit 21 may further be configured to provide scanning according to a pre-programmed measuring process defining an activation and deactivation sequence of multi-beam scan patterns, e.g. wherein the measuring process comprises an initial scanning for identifying objects within the environment to be scanned as well as an initial determining of distances to the identified objects. Such an initial scanning process may involve the step of determining the distances returned by a first set of (leading) beams to determine the scan density of a second (trailing) set of beams.

In addition, using the a-priori knowledge of the target distance in a certain direction as described earlier, instead of using the emitters as single radiation sources each with a different direction, two or more radiation sources may be grouped together and pointed in the same direction to the same point on the target. By using the grouped laser sources in a cooperative manner, the target can be illuminated with a higher intensity while still achieving eye safety. Furthermore by also grouping the congruent receivers an even better signal to noise ratio can be achieved resulting simultaneously in an even further range and improved (smaller) variation of the measured distance.

Figure 3:
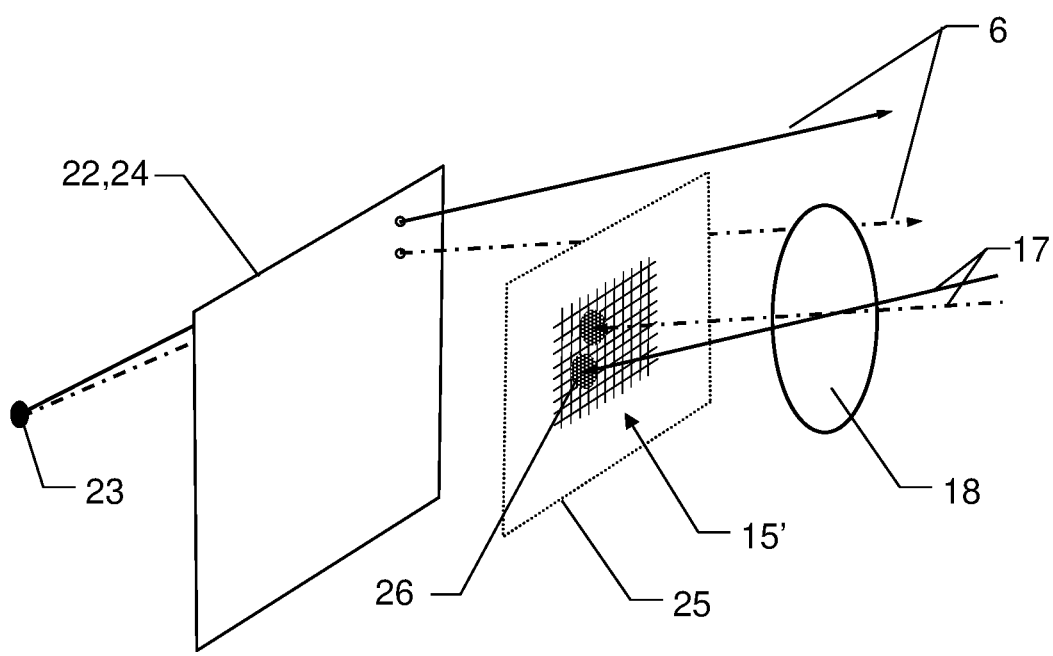
FIG. 3: schematically depicts an inventive multi-beam laser scanner comprising a beamsplitting hologram and a SPAD-based receiver.

FIG. 3 schematically shows an inventive multi-beam laser scanner comprising a beamsplitting holographic structure 22 and a SPAD-based receiver 15' being configured such that multiple sub-areas of the receiver 15' are definable which can be read out separately. In the given example, the transmitter is based on a single radiation source 23. Alternatively, the transmitter may also be based on multiple radiation sources, e.g. of different wavelength.

By using holographic structures the number of radiation sources may be reduced. Because of the multiplication factor of beams projected by the hologram 22, groups of beams 6 of the same wavelength are generated. Additional differentiation between the channels may, for example, be generated by code sequences, wherein the first group of beams is linked to a first diode emitting a first code, and a second group is linked to a second diode and emitting a second code.

By way of example, multi-color back reflections, of which the beams are emitted by an apparently similar source or source direction, originating from the same or overlapping target area can be split at the receiver using for instance prisms or holographic dispersers. Using the hologram, cost and size of the transmitters may be reduced while maintaining the channel separation.

The holograms aligned to associated radiation sources 23 may be interchangeable, e.g. wherein holograms are arranged on a single surface whereby a single actuator may be used for selection of a suitable hologram group, wherein through the variation of the hologram 22, a projection scan pattern is adjusted for optimization of the projection scan pattern in the monitored zone.

The figure further indicates the plane 24 of the beamsplitting hologram 22, the receiving plane 25 comprising the detector 15', and a receiving optics 18 for gathering and aligning returning beams 17 towards associated receiving areas 26 of the SPAD detector 15'.

For example, in such a side-by-side holographic projector and receiver multi-axial morphology the distance between the receiving plane 25 and the hologram plane 24 may be reduced to zero, wherein the receiving elements are mounted to the back of the hologram 22. However, this may reduce reproduction quality.

Figure 4:
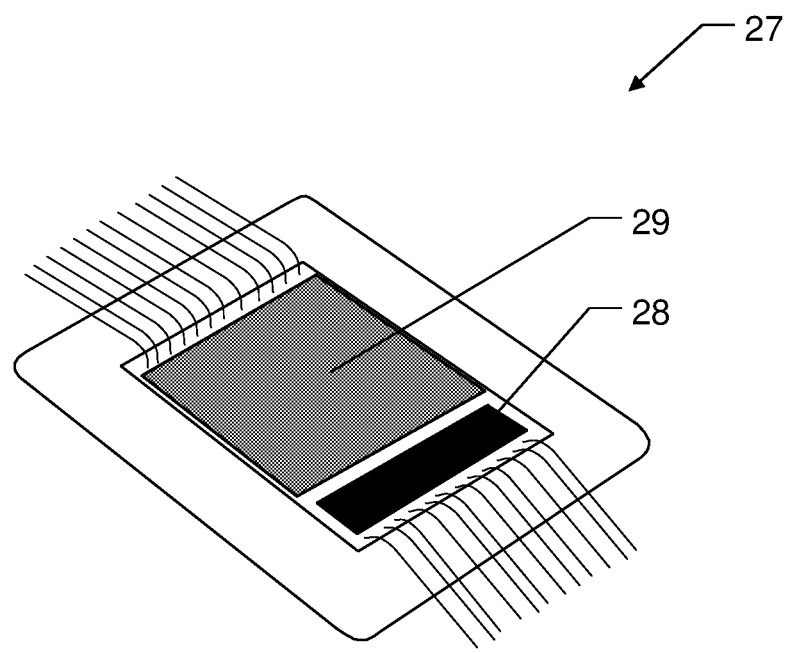
FIG. 4: schematically depicts an integrated chip being configurable by software and having an emitter array and a receiving array.

FIG. 4 schematically shows a chip 27 having an emitter array 28, e.g. a VCSEL or VECSEL array, and a receiving array 29, e.g. a SPAD array. The chip 27 is configurable by software, e.g. controlled by a computing unit of the inventive laser scanner, such that it may be used either as a receiving 30 and/or as an emitting 31 component.

For instance, the collimation of a VCSEL array 28 into a singular beam can be accomplished by a microlens array (not shown) on wafer scale as a light gathering and pre-collimation lens array combined with a macroscopic lens (not shown).

Figure 5:
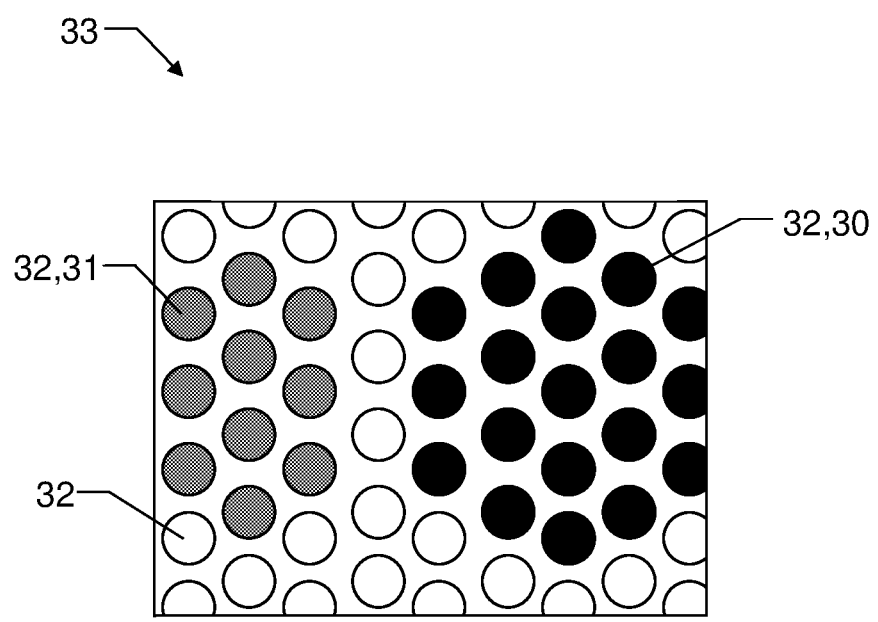
FIG. 5: schematically depicts an active component with selective activation of emitters or groups of emitters and receivers or groups of receivers on a VCSEL array and chip.

Thus, as shown by FIG. 5, part of the integrated chip 27 is selectively configured as light emitting component 31 whereas the other part is selectively configured as a light receiving component 30. By way of example, individual emitting VCSELs can be grouped together into a singular light emitting beam. Likewise, the non-emitting VCSELs, using the light sensitive elements integrated into each VCSEL element, can be grouped into a singular receiver. Using both refractive and diffractive elements, it is also possible to arrange for multiple beams in different angular directions from the same chip. For example, by using the same refractive and diffractive elements, the receiver may be configured to view in the same directions of the emitters. Alternatively, an off-axis design relative to a macroscopic optical element/acroscopic optical element array may be chosen resulting in a selectively different spatial orientation of the resulting laser beam with respect to the central axis of the macroscopic element. By arranging different lateral positions of the emitter components relative to the central axis of the macroscopic optical element by the software, different spatial orientations of the emitted beams result.

FIG. 5 schematically shows individual optically active elements 32 of a chip 27 (FIG. 4) on a wafer 33. Each optically active element 32 can be configured by software, e.g. controlled by a computing unit of the inventive laser scanner, to act as a receiver and/or emitter. Multiple congruent active elements can thereby be grouped together to form a receiving component 30 or an emitting component 31.

By timely varying the selected elements constituting the receiving components 30 and the emitting components 31 a scanning motion can be accomplished.

Although the disclosure is illustrated above, partly with reference to some preferred embodiments, it should be understood that numerous modifications and combinations of different features of the embodiments can be made. These and other modifications lie within the scope of the appended claims.

What is claimed is:

1. A laser scanner for optical surveying of an environment, comprising:
   a multibeam transmitter configured to provide at least two different multi-beam scan patterns being individually activatable by a computing unit, wherein each of the two multi-beam scan patterns comprises simultaneously generated multiple measuring beams defining multiple substantially instantaneous scanning axes;
   a deflection element configured to deflect the multiple measuring beams of the two scan patterns in a scan direction,
   a receiver configured to detect returning parts of the multiple measuring beams of each of the two scan patterns; and
   the computing unit configured:
      for controlling the laser scanner to provide scanning of the environment by the multiple measuring beams,
      for deriving distance measuring data based on the multiple measuring beams, and
      for deriving angle data for respective emitting directions of individual measuring beams of the multiple measuring beams,
   wherein:
      the at least two different multi-beam scan patterns differ from each other in that, compared to each other, the at least two different multi-beam scan patterns provide a different projected beam density, and
      the transmitter is configured such that within each of the two scan patterns, multiple simultaneously generated measuring beams comprise simultaneously generated adjacent measuring beams, wherein simultaneously generated adjacent measuring beams differ by at least one of:
         wavelengths;
         polarization states; and
         pulse codings.

2. The laser scanner according to claim 1, wherein the multi-beam scan patterns differ from each other in that, compared to each other, the multi-beam scan patterns provide at least one of:
   a different number of beams;
   a different projected beam distribution;
   a different beam spacing;
   a different emission timing;
   different individual beam shapes; and
   a different spreading direction of the beams.

3. The laser scanner according to claim 2, wherein:
   the multi-beam scan patterns differ from each other in that, compared to each other, the multi-beam scan patterns provide a different spreading direction of the beams,
   one multi-beam scan pattern is provided as a set of beams which converge to each other such that the beams have a common point of intersection in a propagation direction of the beams, and
   another multi-beam scan pattern is provided as a set of beams which diverge from each other.

4. The laser scanner according to claim 1, wherein the computing unit is configured to activate at least one of the at least two multi-beam scan patterns based on at least one of:
   a distance to an object in the environment to be scanned;
   a defined projected point density to be achieved by the scanning; and
   a defined object type of an object in the environment to be scanned.

5. The laser scanner according to claim 1, wherein:
   the computing unit is configured to activate at least one of the at least two multi-beam scan patterns based on a pre-programmed measuring process defining an activation and deactivation sequence of multi-beam scan patterns of the at least two multi-beam scan patterns, and
   the measuring process comprises at least one of:
      an initial evaluation of distance measuring data associated with at least a first multi-beam scan pattern from the at least two multi-beam scan patterns, and defining the activation and deactivation sequence based on the initial evaluation;
      an initial scanning for identifying an object within the environment to be scanned, and defining the activation and deactivation sequence based on the identified object;
      determining an initial positioning of the laser scanner; and
      adjusting a drive signal of the deflection element and/or a drive signal for adjusting an emission frequency of the measuring beams.

6. The laser scanner according to claim 1, wherein:
   the laser scanner comprises a first zoom optics and/or a first deformable lens element configured for setting different multi-beam scan patterns of the at least two multi-beam scan patterns; and/or
   the laser scanner comprises a second zoom optics and/or a second deformable lens element configured for aligning a beam of the multiple measuring beams with the receiver.

7. The laser scanner according to claim 1, wherein:
   the transmitter comprises multiple laser diodes arranged on a carrier;
   the carrier has at least two different flexure states; and
   based on different flexure states in each case the laser diodes generate different multi-beam scan patterns of the at least two multi-beam scan patterns.

8. The laser scanner according to claim 1, wherein:
   the transmitter comprises one or multiple radiation sources;
   the transmitter comprises a holographic structure and is configured for generating a first and a second group of beams based on the holographic structure; and
   the transmitter and the computing unit are configured such that one multi-beam scan pattern of the at least two multi-beam scan patterns is based on the first group of beams and another multi-beam scan pattern of the at least two multi-beam scan patterns is based on the second group of beams.

9. The laser scanner according to claim 8, wherein:
   the first group of beams is generated based on a first radiation source; and
   the second group of beams is generated based on a second radiation source.

10. The laser scanner according to claim 8, wherein:
   the first group of beams is generated based on a first radiation source;
   the second group of beams is generated based on a second radiation source;
   the receiver comprises an objective lens;
   the transmitter comprises the first and the second radiation source;
   the transmitter is configured to generate the first group of beams based on the first radiation source and to generate the second group of beams based on the second radiation source; and the holographic structure is configured such that the beams of the first and the second group of beams emanate from the objective lens.

11. The laser scanner according to claim 1, wherein:
the receiver comprises an opto-electronical sensor based on an arrangement of a multitude of microcells;
the sensor is configured as an array of single photon avalanche photodiodes;
the sensor is configured such that the microcells can be read out individually or in groups of microcells, such that sub-areas of the receiver are settable to be read out separately;
the receiver and the computing unit are configured such that different sub-areas of the receiver are set by the computing unit; and
wherein the multiple measuring beams have different measuring beams, wherein returning parts of different measuring beams of the multiple measuring beams in each case are read out by different sub-areas of the receiver.

12. The laser scanner according to claim 11, wherein:
the receiver comprises multiple opto-electronical sensors, including multiple arrays of single photon avalanche photodiodes; and
the multiple sensors are arranged in a one-dimensional, two-dimensional, or three-dimensional manner, each sensor having separate control and/or evaluation electronics.

13. The laser scanner according to claim 1, wherein:
the laser scanner comprises a customizable component, the customizable component comprising an optically active element formed by at least one of:

a customizable emitter array, including a VCSEL or a VECSEL array, configured to form a customizable emitting component for generating at least one beam of the multiple measuring beams; and
a customizable receiving array, configured to form a customizable receiving component for detecting returning parts of the multiple measuring beams.

14. The laser scanner according to claim 13, wherein:
the laser scanner comprises a plurality of the customizable components; and
each customizable component is configurable by software such that customizable components are grouped to at least one common receiving component and/or to at least one common emitting component.

15. The laser scanner according to claim 1, wherein:
the laser scanner is configured to provide simultaneous scanning with a first and a second multi-beam scan pattern of the at least two multi-beam scan patterns; and
the repetition rate for deriving distance measuring data based on the first scan pattern is different from the repetition rate for deriving distance measuring data based on the second scan pattern.

16. The laser scanner according to claim 15 wherein:
the first scan pattern provides a set of diverging beams of a first wavelength; and
the second scan pattern provides a set of beams of a second wavelength, said second wavelength being different from the first wavelength.

* * * * *